United States Patent
Al-Eidan

(10) Patent No.: US 7,027,505 B2
(45) Date of Patent: Apr. 11, 2006

(54) SYSTEM AND METHOD FOR BANDWIDTH COMPRESSION OF FREQUENCY AND PHASE MODULATED SIGNALS AND SUPPRESSION OF THE UPPER AND LOWER SIDEBANDS FROM THE TRANSMISSION MEDIUM

(76) Inventor: Abdullah A. Al-Eidan, P.O. Box 67175, Bayan (KW) 43762

( * ) Notice: Subject to any disclaimer, the term of this patent is extended or adjusted under 35 U.S.C. 154(b) by 837 days.

(21) Appl. No.: 09/847,993

(22) Filed: May 4, 2001

(65) Prior Publication Data

US 2002/0163962 A1 Nov. 7, 2002

(51) Int. Cl.
*H04B 1/66* (2006.01)
*H04B 1/16* (2006.01)
*H03K 9/00* (2006.01)
*H03K 7/06* (2006.01)

(52) U.S. Cl. ............... 375/240; 375/316; 375/271; 455/205

(58) Field of Classification Search ........... 375/316, 375/246–271; 455/42–44, 205
See application file for complete search history.

(56) References Cited

U.S. PATENT DOCUMENTS 4,586,174 A * 4/1986 Wong ................. 370/496
5,200,835 A * 4/1993 Sakamoto ............. 386/1
6,205,184 B1 3/2001 Al-Eidan
2002/0030877 A1 * 3/2002 Way et al. ............. 359/183

FOREIGN PATENT DOCUMENTS

EP 0 720 315 8/1999

* cited by examiner

*Primary Examiner*—Stephen Chin
*Assistant Examiner*—Cicely Ware
(74) *Attorney, Agent, or Firm*—Jacobson Holman PLLC

(57) ABSTRACT

A system and method for improving radio communication of frequency or phase modulated transmission and reception. Signal transmission is implemented by suppression of the upper and lower sidebands of a narrowband or very narrowband FM/PM signal from the transmission medium such that transmission is limited to the instantaneous frequency varied about the carrier frequency (center frequency). Suppression may be achieved by adding a bandpass filter between the modulator and the power amplifier of the narrowband FM transmitter. Upon receipt of the suppressed sideband signal, the received signal is converted to a first narrowband IF signal, and then the narrowband or very narrowband frequency deviation IF signal is expanded by frequency multiplication to generate a second wideband or very wideband IF signal. A discriminator may be used to convert the frequency-multiplied signal into a low frequency signal or audio signal for further processing. Through sideband suppression, bandwidth requirements are reduced without affecting sound quality and signal-to-noise ratio is improved.

32 Claims, 14 Drawing Sheets

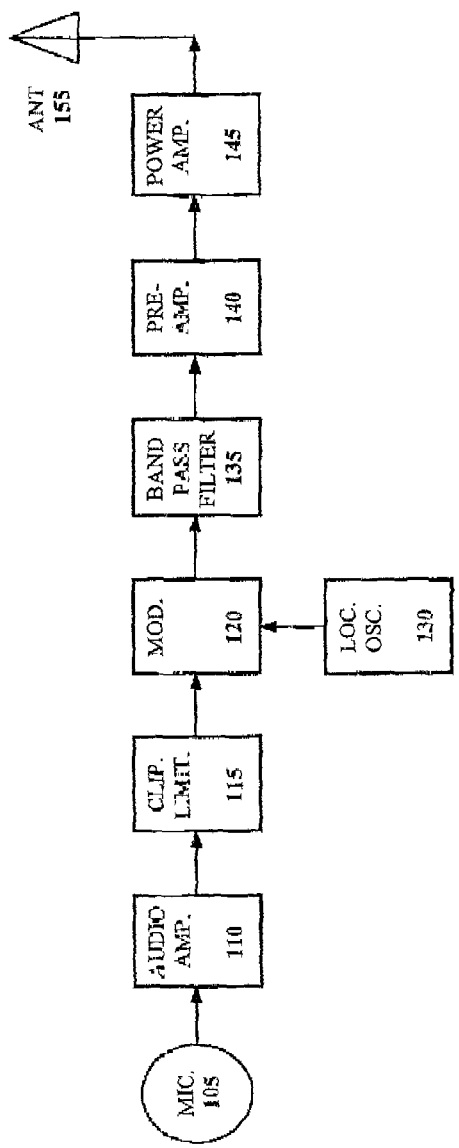
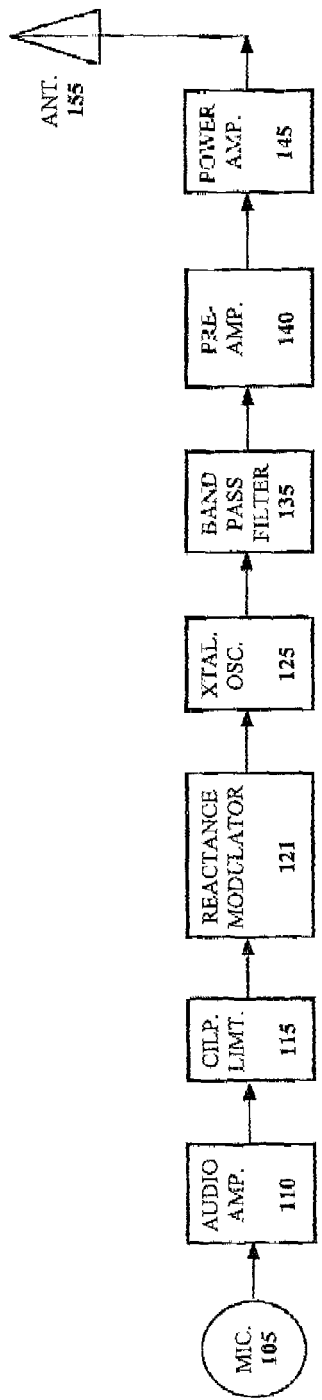
FIG. 1A
FIG. 1B

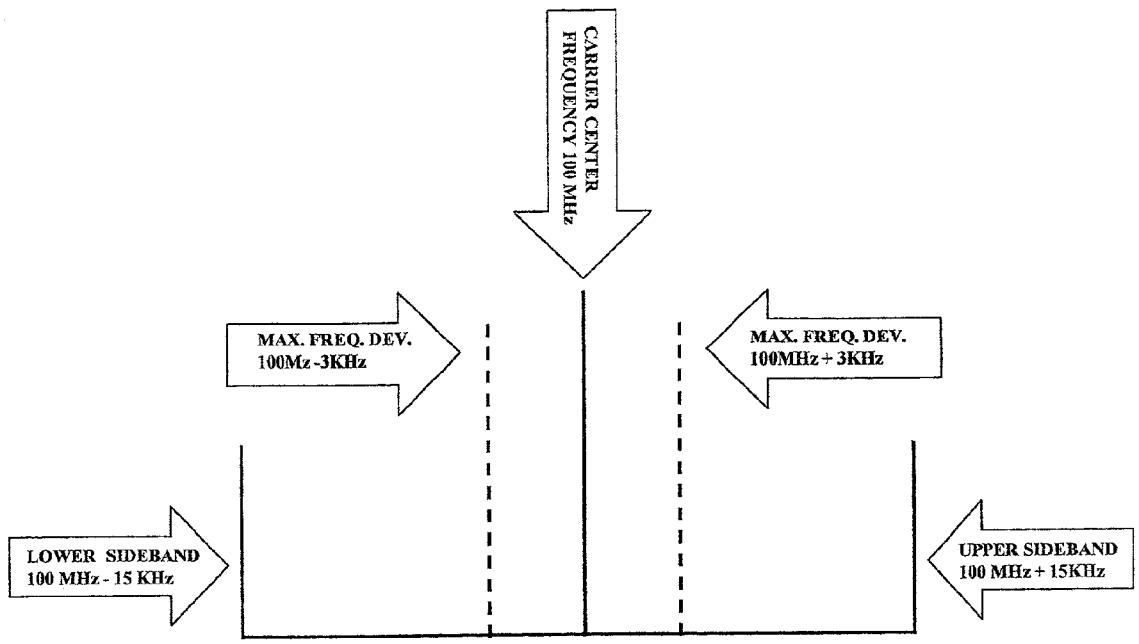
FIGURE No. 3 A
CARRIER FREQUENCY 100 MHz. MODULATING
FREQUENCY 15 KHz MODULATION INDEX 0.2
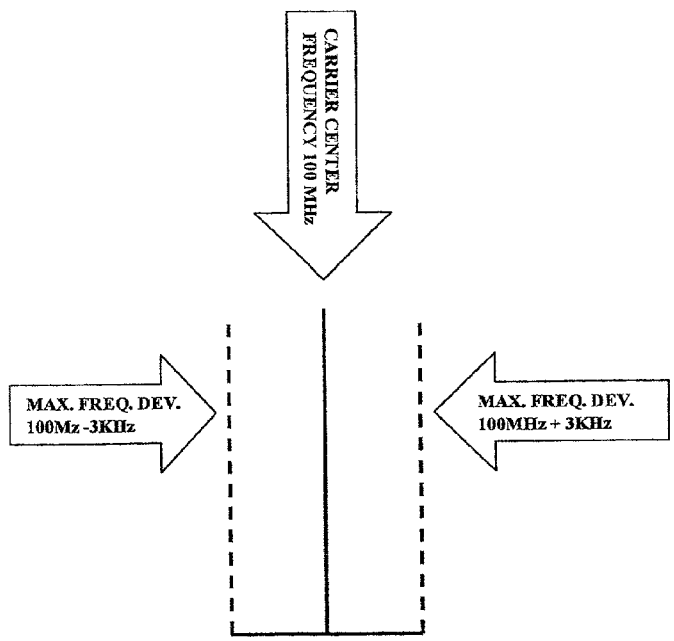
FIGURE No. 3 B SUPPRESSED SIDEBANDS
CARRIER FREQUENCY 100 MHz. MODULATING
FREQUENCY 15 KHz MODULATION INDEX 0.2

SYSTEM AND METHOD FOR BANDWIDTH COMPRESSION OF FREQUENCY AND PHASE MODULATED SIGNALS AND SUPPRESSION OF THE UPPER AND LOWER SIDEBANDS FROM THE TRANSMISSION MEDIUM

BACKGROUND OF THE INVENTION

1. Field of the Invention

The present invention relates to communication systems using narrow or very narrow band channels, so that the number of channels available for different types of communication systems (for example, cellular telephones, pagers, police/fire/rescue) can be increased. Specifically, the invention relates to a system and method for transmitting and receiving signals using frequency modulation (FM) or phase modulation (PM) on narrowband or very narrowband channels.

2. Related Art

Existing frequency or phase modulation systems have advantages over amplitude modulation systems. These advantages include excellent sound quality, higher signal-to-noise ratio, and the availability of communication channels in the electromagnetic spectrum, which overcomes the disadvantages of wide-band frequency modulation. As a result, manufacturers of radio communication systems and communication research centers have not encouraged improvements to existing FM/PM systems.

In recent years, with the expansion of pagers, cellular telephones, the Internet and other computer networks, the VHF and UHF bands have become very congested and the demand for more channels has forced manufacturers to use higher frequency bands. The higher baud rate, digital data transmission requires a wide band. To reduce the bandwidth of the digital communication channels, data compression techniques have been implemented. These techniques do not work, however, for on-line audio and video communication because of the time delay caused by the compression and decompression processes.

In order to satisfy the high demand for more communication channels, technology must be developed that will dramatically reduce the bandwidth of the communication channel, transmit more bits per second per hertz of bandwidth, and increase the power of the transmitted information without adversely affecting sound quality.

SUMMARY OF THE INVENTION

The present invention is directed to suppressing upper and lower significant sidebands by modulating an information signal with a modulation index M fo not greater than 0.2 to generate a narrowband FM or PM information signal having a small frequency deviation at the transmitting side of a narrowband communication channel.

The present invention configures a new system that significantly improves radio communication of FM or PM transmission and reception. The signal transmission is implemented by suppression of the upper and lower side bands of the narrowband or very narrowband FM/PM signal from the transmission medium. As a result, only the instantaneous frequency varied about the carrier frequency, the center frequency, is transmitted. The number of times per second that the instantaneous frequency is varied about the carrier frequency (center frequency) is the modulating frequency. The modulating frequency components are contained in the FM/PM wave regardless of the modulation index, while the amount of frequency deviation is proportional to the amplitude of the modulating signal and independent of the modulating frequency.

The present invention involves a method that includes the steps of receiving the suppressed sideband signal, converting the received signal to a first narrowband IF (intermediate frequency) signal, and then expanding the narrowband (NB) or very narrowband (VNB) frequency deviation IF signal. The narrowband or very narrowband frequency deviation IF signal is expanded by frequency multiplication to generate a second wideband or very wideband IF signal. A discriminator may be used to convert the frequency-multiplied signal into a low frequency signal or audio signal for further processing. Ideally, the discriminator is a linear frequency to voltage converter circuit, which transforms the variations in the instantaneous frequency into variations in the amplitude. A large frequency deviation (high modulation index) will improve signal-to-noise ratio (SNR) and fidelity. The larger the frequency deviation at the input of the discriminator, the higher the amplitude signal at the output of the discriminator and thus the higher the SNR and the higher the fidelity because, as the frequency deviation increases, the discriminator becomes more sensitive and can detect minor frequency deviation which represents the fine detail of the modulating signal.

The present invention reduces the bandwidth of the communication channels and incorporates the advantages of both narrowband frequency modulation (NBFM) and wideband frequency modulation (WBFM) without the disadvantages of either. The new technology can be used to transmit either analog or digital information and can be applied over a wide range of carrier frequencies. The result is improved radio communication, especially in the areas of mobile, satellite and spacecraft communication where the power supply source and number of communication channels is limited.

With the present invention, it is possible to realize the dream of a low cost narrowband high-speed high-performance wired/wireless communication that can support the application of computer networks and associated audio and video conferencing over computer networks such as the Internet.

BRIEF DESCRIPTION OF THE DRAWINGS

The invention is better understood by reading the following Detailed Description of the Preferred Embodiments with reference to the accompanying drawing figures, in which like reference numerals refer to like or similar elements throughout, and in which:

FIG. 1A shows a block diagram of an embodiment of a narrowband/very narrowband transmitter for the suppressed sidebands of FM/PM signals constructed in accordance with the present invention;

FIG. 1B shows a block diagram of an alternative embodiment of a narrowband/very narrowband transmitter for the suppressed sidebands of FM/PM signals constructed in accordance with the present invention;

FIG. 3A is a graphical representation of a conventional narrowband/very narrowband FM/PM transmitted signal;

FIG. 3B is a graphical representation showing the suppressed upper and lower sidebands of the narrowband/very narrowband FM/PM transmitted signal according to the present invention;

DETAILED DESCRIPTION OF THE PREFERRED EMBODIMENTS

Figure 2:
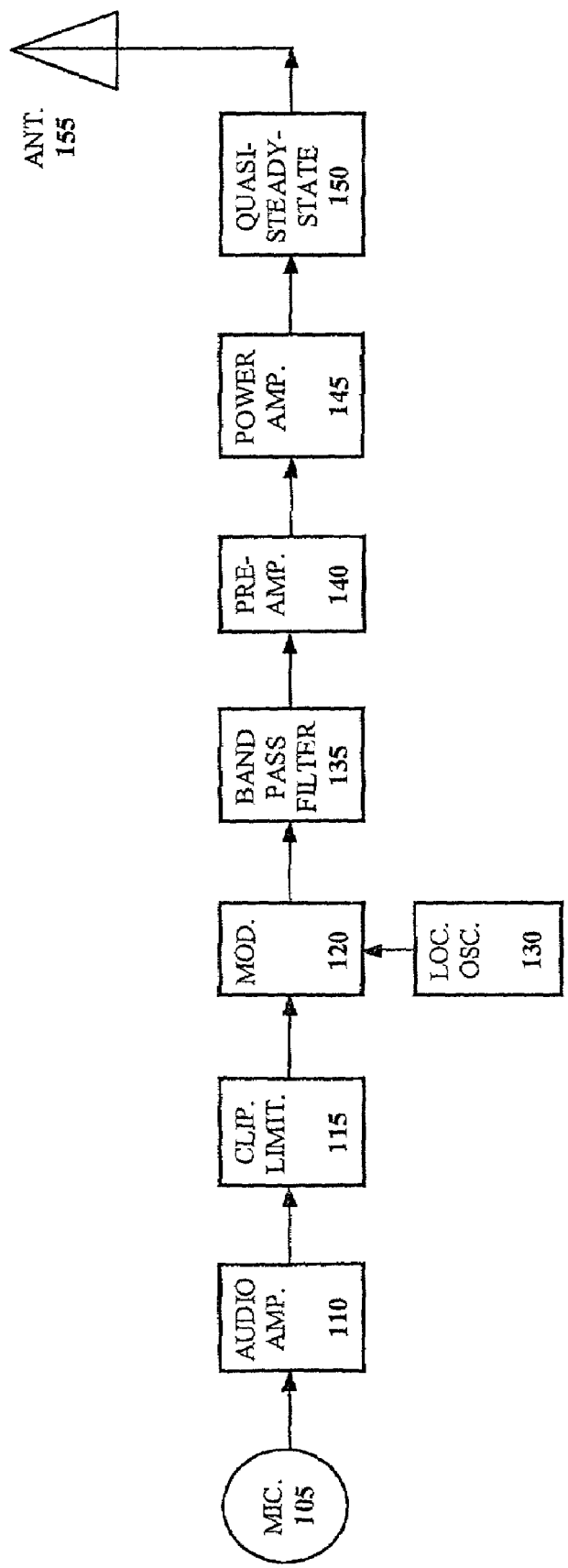
FIG. 2 is a block diagram of a further alternative embodiment of a narrowband/very narrowband transmitter for the suppressed sidebands of FM/PM signals constructed in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. A frequency modulation (FM) system is described in detail by way of example, although it is understood that corresponding phase modulator components can be substituted for frequency modulator components to form a phase modulation (PM) system. Moreover, minor functional elements (such as power supplies and the like) well understood by those skilled in the art have been purposely omitted from the following discussion.

In FM/PM, there are two stages of frequency deviation. The first stage, where primary frequency deviation is performed, occurs in the frequency/phase modulator. In the modulator, the carrier frequency fluctuates or deviates at a rate according to the amplitude or to the amplitude and frequency of the modulating signal. The second stage, where secondary frequency deviation is performed, occurs in the frequency multiplier stage.

The result of the two stages of frequency deviation offers a means for obtaining practically any desired amount or value for the carrier frequency, frequency deviation and modulation index. In an FM/PM receiver, the value of the modulation index M determines the quality of the sound. If the modulation index is high, thereby corresponding to a high level of frequency deviation (wideband), the frequency discriminator becomes more sensitive, can detect minor modulating signals, and has a better signal to noise ratio.

The invention provides FM/PM transmitters and receivers in which frequency or phase modulating of the signal to be transmitted is performed at the transmitting side of a communication channel with a preselected small or very small frequency deviation (modulation index $M \leq 0.2$) and with upper and lower sideband suppression. After the frequency or phase modulated signal is transmitted via the communication channel and received at the receiving side of the communication channel, a narrowband intermediate frequency (IF) signal is applied, and the frequency deviation of the received signal is expanded. This frequency deviation expansion at the receiving side of the communication channel is preferably realized by frequency multiplication. Consequently, the expanded frequency or phase modulated signal can be further processed in any desired manner.

According to the present invention, the structure of an existing narrowband FM transmitter is modified by adding a bandpass filter between the modulator and the power amplifier to suppress the upper and lower sidebands. By including such a filter, the transmitted power in the narrowband FM signal is concentrated in the instantaneous frequency varied about the carrier frequency (center frequency) which dramatically reduces the bandwidth requirement without adversely affecting sound quality. In addition, SNR is improved and all the transmitted power is provided to the transmitted intelligence (the transmitted signal).

The suppression of the upper and lower sidebands by a bandpass filter or other method, after the modulator stage, is described herein with reference to exemplary embodiments shown in the accompanying drawings. Other means of achieving sideband suppression may also be used, as would be known in the art, without departing from the spirit or scope of the present invention.

A preferred frequency or phase modulation transmitter according to the present invention is shown in FIG. 1A. After the input 105, which may be embodied as a microphone, the transmitter includes an audio amplifier 110, followed by a clipper limiter 115, followed by a modulator stage 120 (such as a frequency modulator) with local oscillator 130. Connected in series with the output of the modulator stage is a bandpass filter 135, preamplifier 140 and a power amplifier 145 which drives a suitable antenna 155 or other communication channel interface. Significantly, the modulation index M is selected to be a small value, preferably less than or equal to 0.2, resulting in a small/very small frequency band for transmitting the output signal of the transmitter.

FIG. 1B shows a block diagram of an alternative embodiment of the modulator-transmitter for transmitting a narrowband/very narrowband FM/PM modulation signal. Many elements of this embodiment correspond to those of the transmitter of FIG. 1A, and will not be described repetitively. However, instead of modulator 120 and local oscillator 130 as in FIG. 1A, the FIG. 1B embodiment includes a reactance modulator 121 and crystal oscillator 125 arranged in series between clipper limiter 115 and bandpass filter 135.

FIG. 2 is a block diagram of a further alternative embodiment of the FM/PM transmitter; an FM transmitter is described by way of example. Many elements in this embodiment correspond to those of the transmitter already described in FIG. 1, and reference is hereby made thereto.

To remove distortion in the shape of the FM signal, the modulation index is low, especially in the lower frequency where it takes a longer time for each frequency cycle. A quasi-steady-state circuit 150 is inserted after the power amplifier 145. The quasi-steady-state circuit can be implemented as a resonant load impedance of power amplifier. Through the addition of the quasi-steady-state circuit 150, distortion in the FM or PM signal can be reduced.

FIG. 3A is a graphical representation of the output of the narrowband/very narrowband FM/PM modulator 120 of FIGS. 1A and 2. FIG. 3B is a graphical representation of the output of the bandpass filter 135 of FIGS. 1A, 1B and 2. As shown, the bandpass filter suppresses the upper and lower sidebands of the narrowband/very narrowband FM/PM modulated signal.

Figure 4:
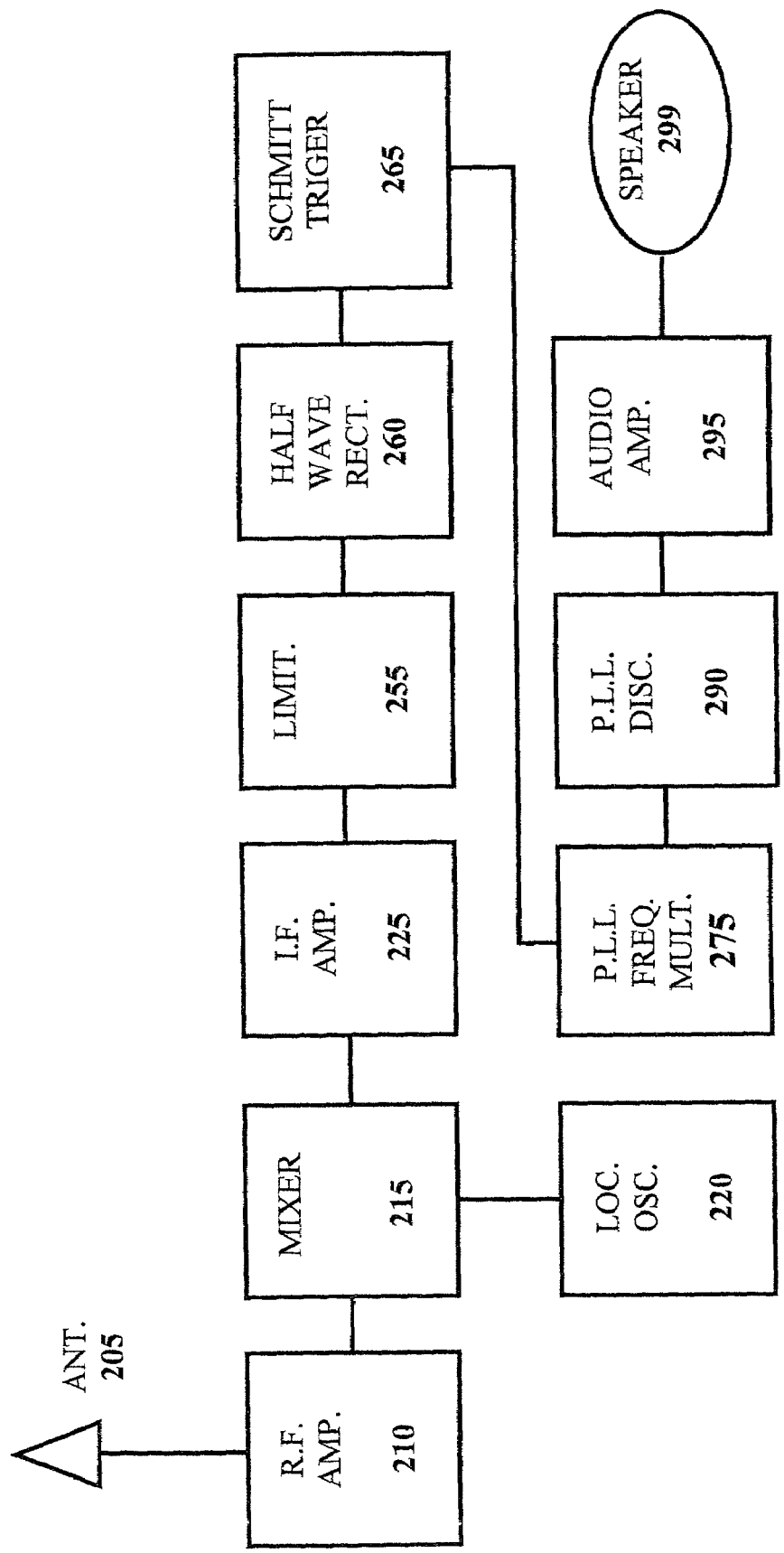
FIG. 4 shows a block diagram of an embodiment of a narrow/very narrow band receiver for FM signals constructed in accordance with the present invention.

FIG. 4 shows an embodiment of a receiver for receiving the narrow band FM signal transmitted from the transmitter according to FIGS. 1A–3B. The receiver includes a suitable antenna 205 (or other communication channel interface), an RF amplifier 210, a mixer 215 with a local oscillator 220 for down converting the received FM or PM signal into an IF-signal. The mixer 215 is succeeded by an IF amplifier 225 which is followed by a limiter 255 to eliminate all amplitude variation from the signal. Also, the DC component is removed from the signal. The limiter 255 is connected to a half wave rectifier 260 to cut the negative half of the IF sine wave signal. The half wave rectifier 260 is succeeded by a schmitt trigger 265 to shape the positive half of the IF signal into positive pulses.

In accordance with a preferred embodiment of the invention, the receiver includes a frequency multiplier stage 275 (preferably a PLL—phase lock loop) to multiply the IF positive pulses to generate an expanded frequency deviation which compensates for the narrow band frequency deviation which was transmitted.

The frequency multiplier stage 275 is followed by a PLL discriminator 290 which converts the output of the limiter back to an audio signal which may be applied to an audio amplifier 295 and to a piece of conventional audio equipment including a speaker 299.

It is an advantage of the invention that, when the frequency expanded signal is applied to discriminator 290, the discriminator shows improved discrimination properties with less distortion as compared with the processing of a non-expanded signal. Accordingly, the combination of a narrow or very narrow band modulator transmitter (FIGS. 1A–3B) with a frequency multiplier (e.g., element 275) provides a significant advantage over known systems.

The frequency multiplication in element 275 may be implemented using, for example, a suitable non-linear circuit element and filtering out the non-wanted frequency ranges. For example, a conventional limiter circuit may be used which generates a pulse signal from a sine signal. Because the pulse signal includes all odd harmonics of the input sine function, a higher frequency component thereof, for example the ninth harmonic, may be filtered out, thus realizing a multiplication of the frequency by a multiplication factor 9.

To realize even higher multiplication factors, a plurality of these multipliers may be connected in series. To compensate any resulting loss in amplitude, additional amplification could be employed.

Figure 5:
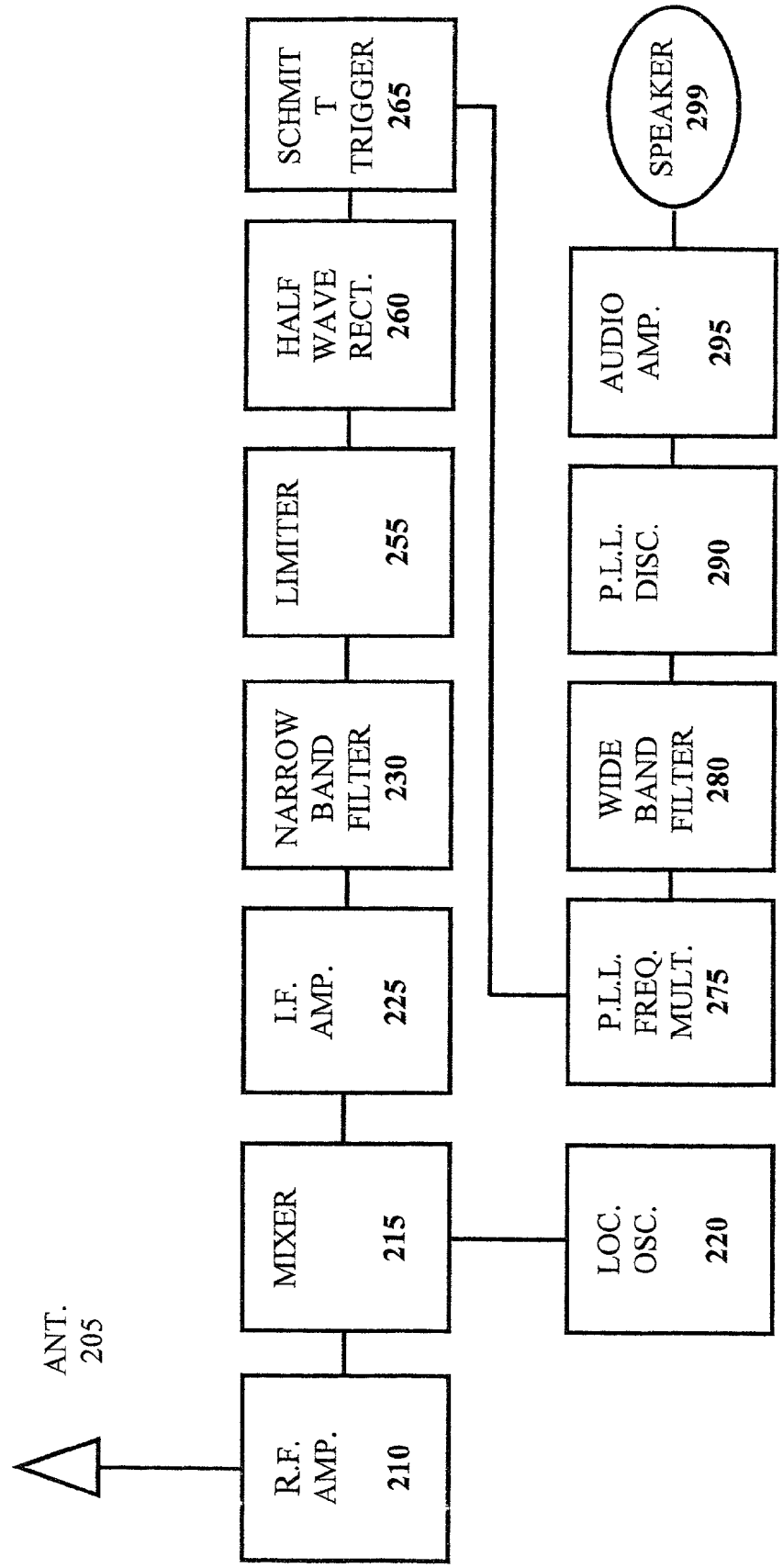
FIG. 5 shows a block diagram of an alternative embodiment of a narrow/very narrow band receiver constructed in accordance with the present invention.

FIG. 5 shows a block diagram of an alternative embodiment of the receiver to receive the narrow/very narrow band FM/PM modulation signal as transmitted from the transmitter according to FIGS. 1A–3B. Many elements of this embodiment correspond to those of the receiver of FIG. 4, and will not be described repetitively. In addition to the elements of FIG. 4, the FIG. 5 embodiment includes a narrow band filter 230 inserted between if amplifier 225 and limiter 255, and a wide band filter 280 inserted between frequency multiplier 275 and PLL discriminator 290.

Figure 6:
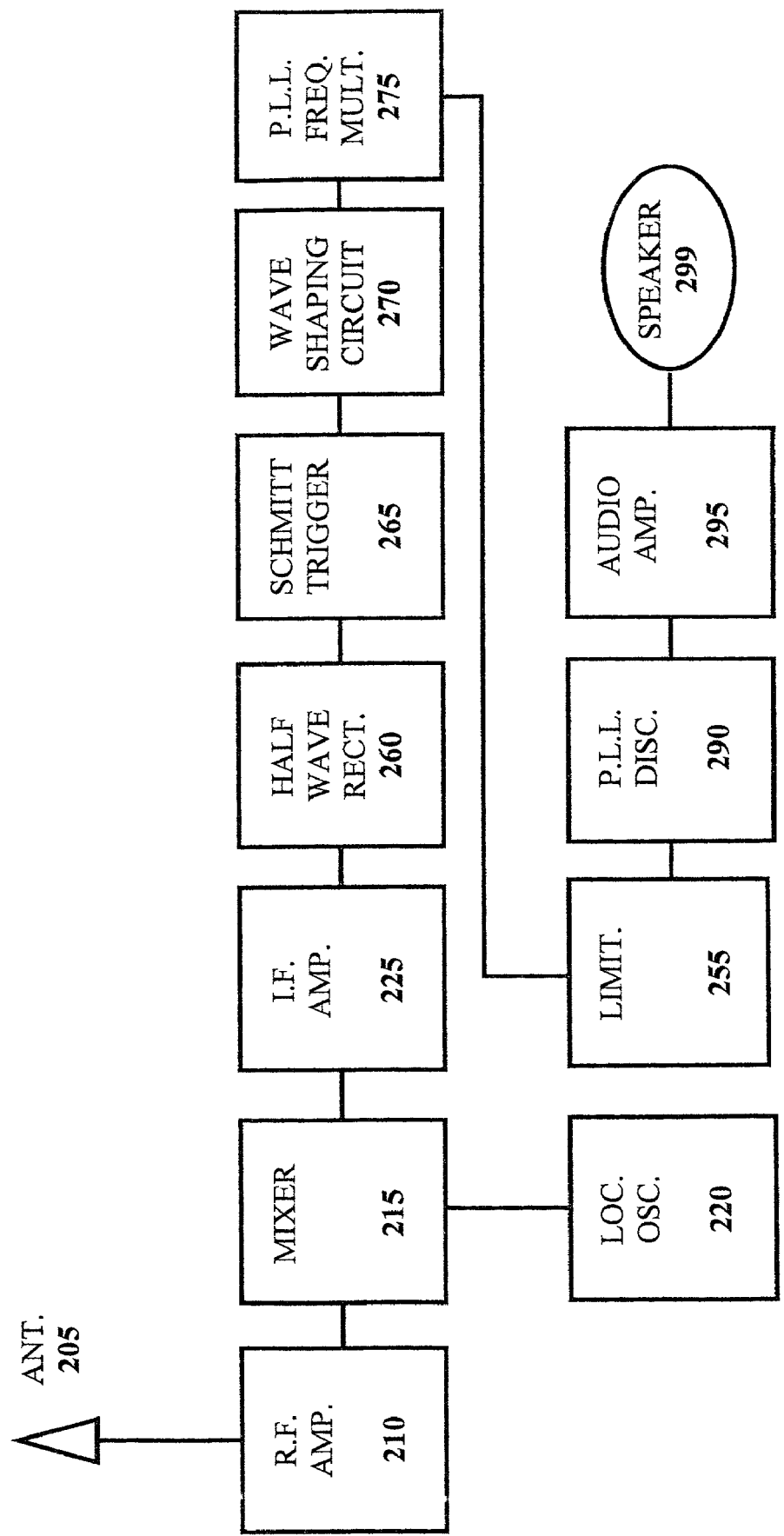
FIG. 6 shows a block diagram of a further alternative embodiment of a narrow/very narrow band receiver constructed in accordance with the present invention.

FIG. 6 shows a block diagram of an alternative embodiment of the receiver to receive the narrow/very narrow band FM/PM modulation signal as transmitted from the transmitter according to FIGS. 1A–3B. Many elements of this embodiment correspond to those of the receiver of FIG. 4, and will not be described repetitively.

However, in addition to the elements FIG. 4, to remove distortion from schmitt trigger 265, a wave shaping circuit 270 is inserted after the schmitt trigger 265 of FIG. 6 to cut the noise and hysteresis over the positive IF pulses. Some conventional schmitt trigger integrated circuits have this output. This function can also be performed by, for example, a zener diode to smooth the top of the IF pulses, an inverter to invert the IF pulses, or a monostable multivibrator triggered by the positive going pulse to get a very clean positive pulse and the time of the output controlled by the resistor and the capacitor in the input of the circuit.

Also in the embodiment of FIG. 6 is another limiter 285 added after the frequency multiplier 275 to eliminate amplitude variation in the frequency-multiplied signal. The limiter's output is connected to the PLL discriminator 290.

Figure 7:
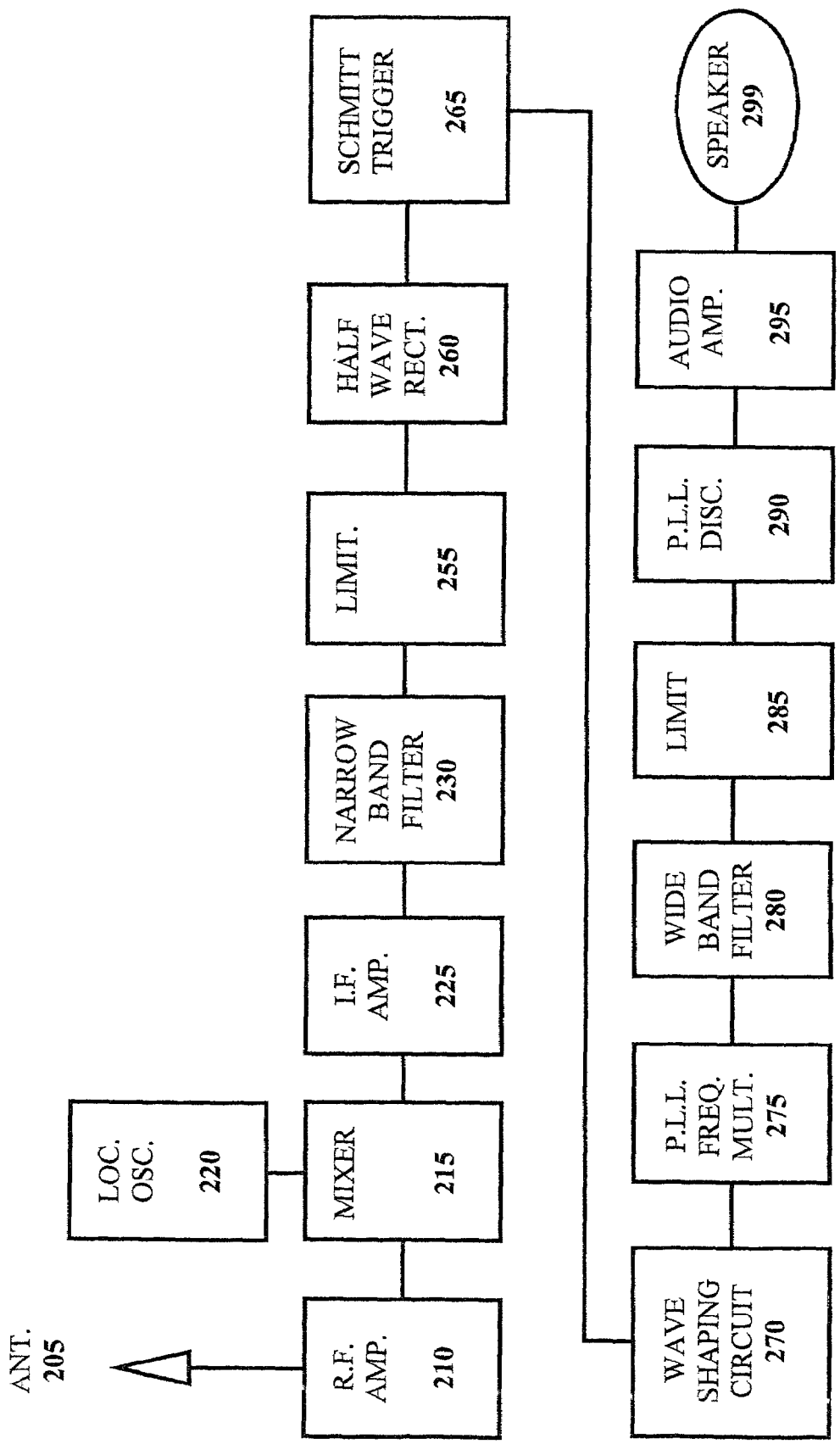
FIG. 7 shows a block diagram of a further alternative embodiment of a narrow/very narrow band receiver constructed in accordance with the present invention.

FIG. 7 shows a block diagram of an alternative embodiment of the receiver to receive the narrow/very narrow band FM/PM modulation signal as transmitted from the transmitter according to FIGS. 1A–3B. Many elements of this embodiment correspond to those of the receiver of FIG. 6, and will not be described repetitively. In addition to the elements of FIG. 6, the FIG. 7 embodiment includes a narrow band filter 230 inserted between IF amplifier 225 and limiter 6, and a wide band filter 280 inserted between frequency multiplier 275 and limiter 285.

Figure 8:
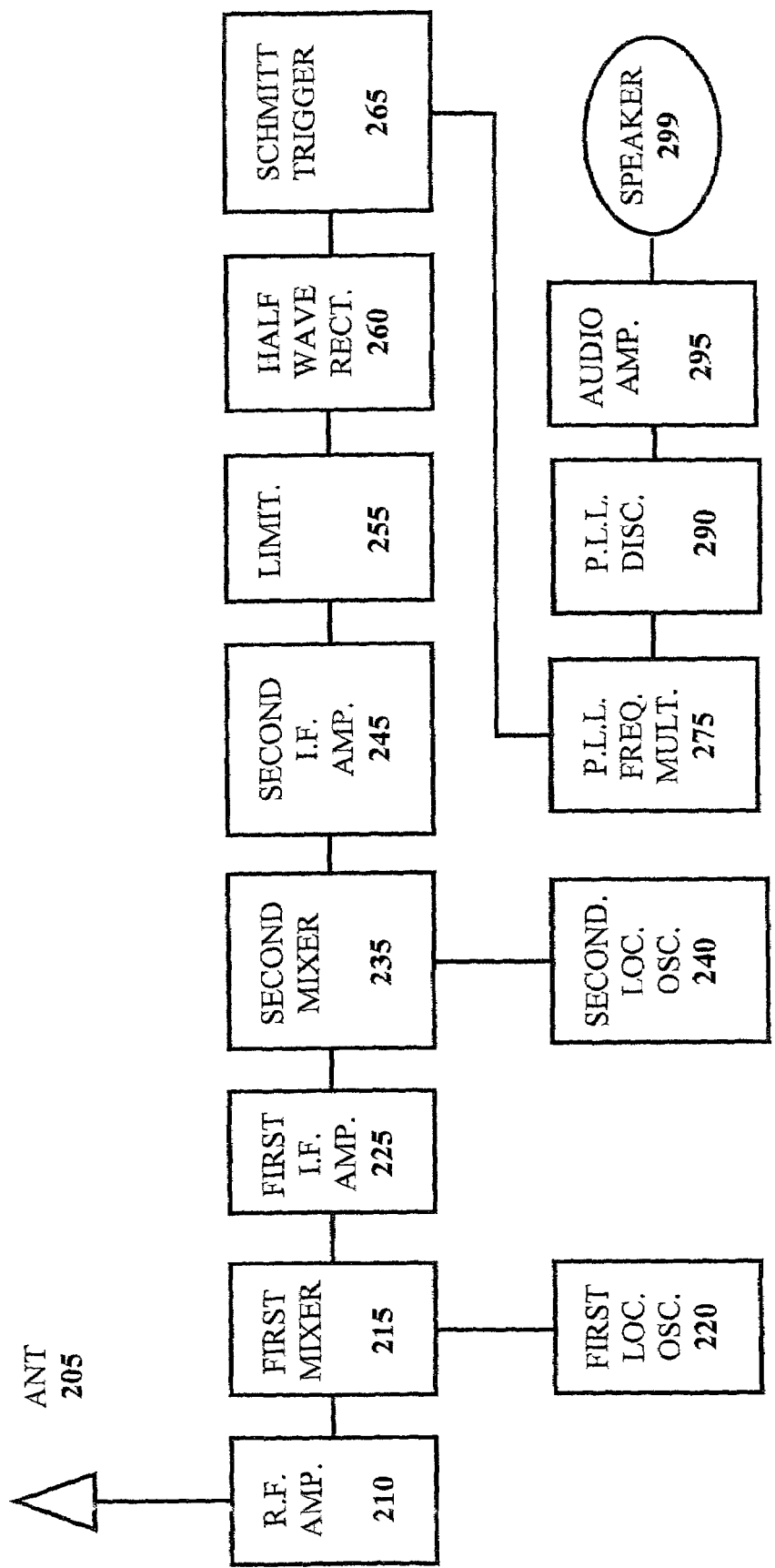
FIG. 8 shows a block diagram of a further alternative embodiment of a narrow/very narrow band receiver in accordance with the present invention.

FIG. 8 shows a block diagram of an alternative embodiment of the receiver to receive the narrow/very narrow band FM/PM signal as transmitted from the transmitter according to FIGS. 1A–3B. Many elements of this embodiment correspond to the receiver according to the FIG. 4, and will not be repetitively described.

In the FIG. 8 embodiment, to reduce the IF frequency to 455 KHZ or less, a second mixer 235, a second local oscillator 240 and a second IF amplifier 245 are added between the first IF amplifier 225 and the limiter 255. This insertion prevents a very high IF frequency signal which might exceed the frequency limitations of the PLL.

Figure 9:
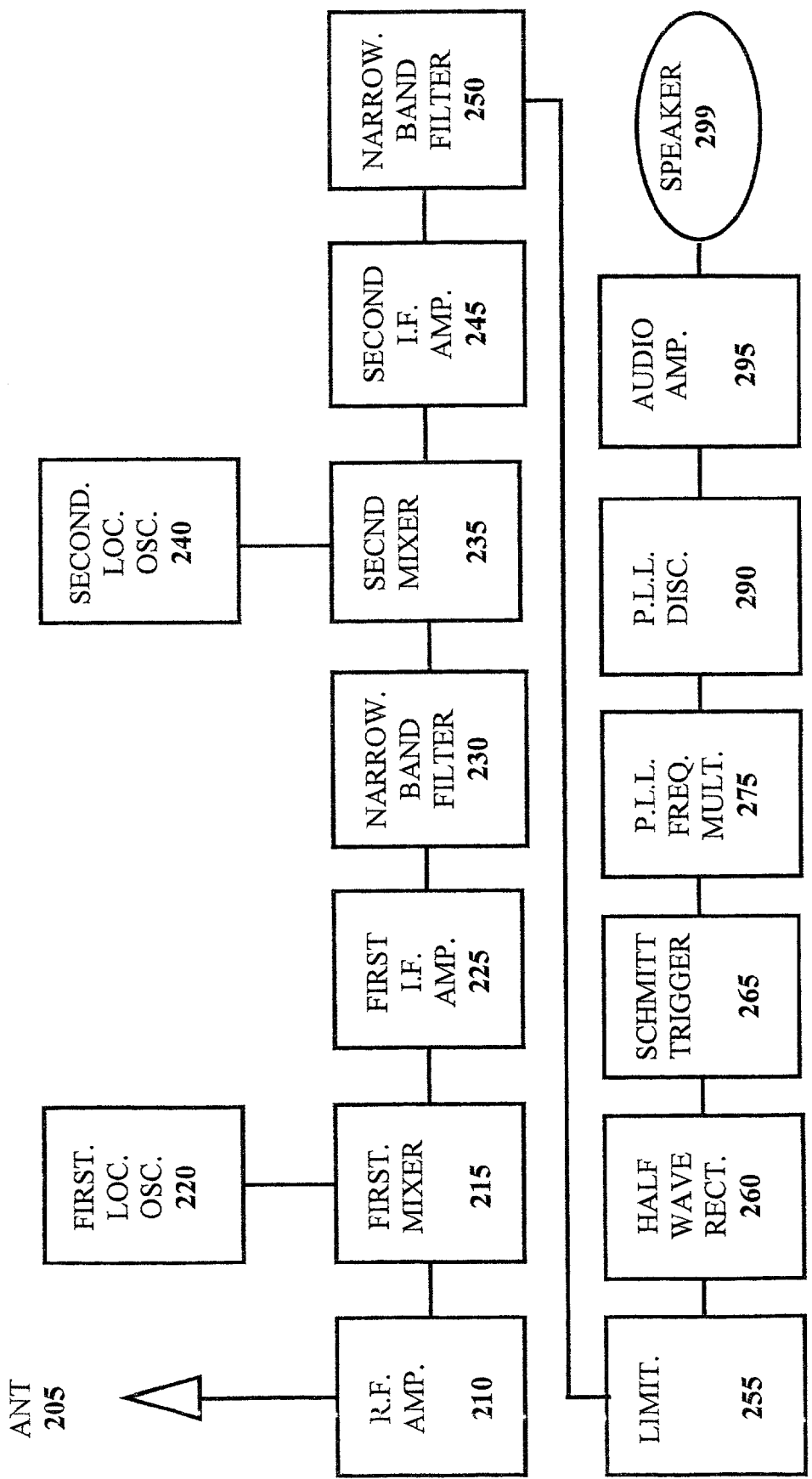
FIG. 9 shows a block diagram of a further alternative embodiment of a narrow/very narrow band receiver constructed in accordance with the present invention.

FIG. 9 shows a block diagram of an alternative embodiment of the receiver to receive the narrow/very narrow band FM/PM signal as transmitted from the transmitter according to FIGS. 1A–3B. Many elements of this embodiment correspond to those of the receiver of FIG. 8, and will not be described repetitively. In addition to the elements of FIG. 8, the FIG. 9 embodiment includes a narrowband filter 230 inserted between IF amplifier 225 and mixer 235, and a second narrowband filter inserted between IF amplifier 245 and limiter 255.

Figure 10:
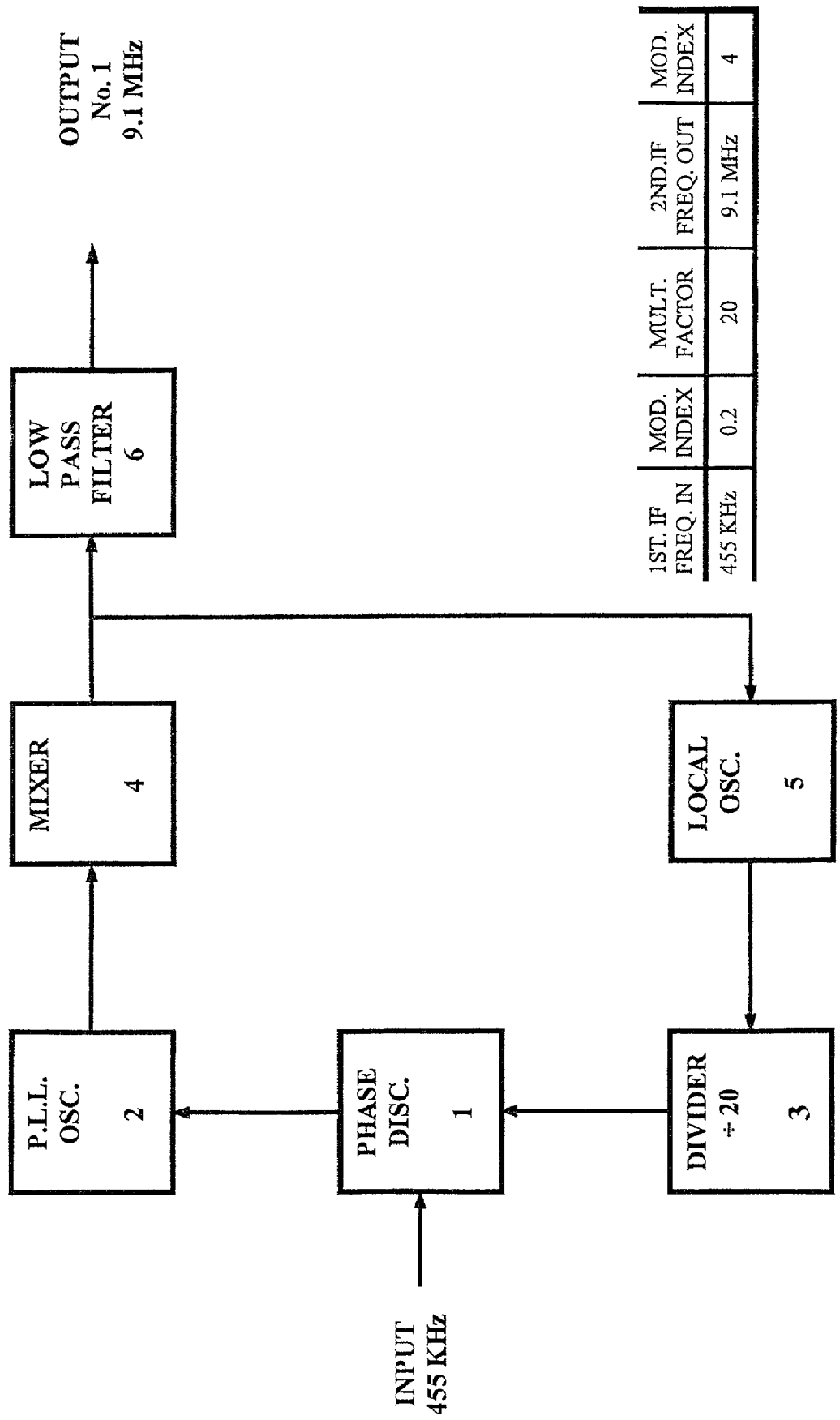
FIG. 10A shows an exemplary phase lock loop which may be used to implement the frequency multiplication function with a multiplication factor of 20, according to the present invention.
FIG. 10B shows an exemplary phase lock loop which may be used to implement the frequency multiplication function with a multiplication factor of 100, according to the present invention.
Figure 10:
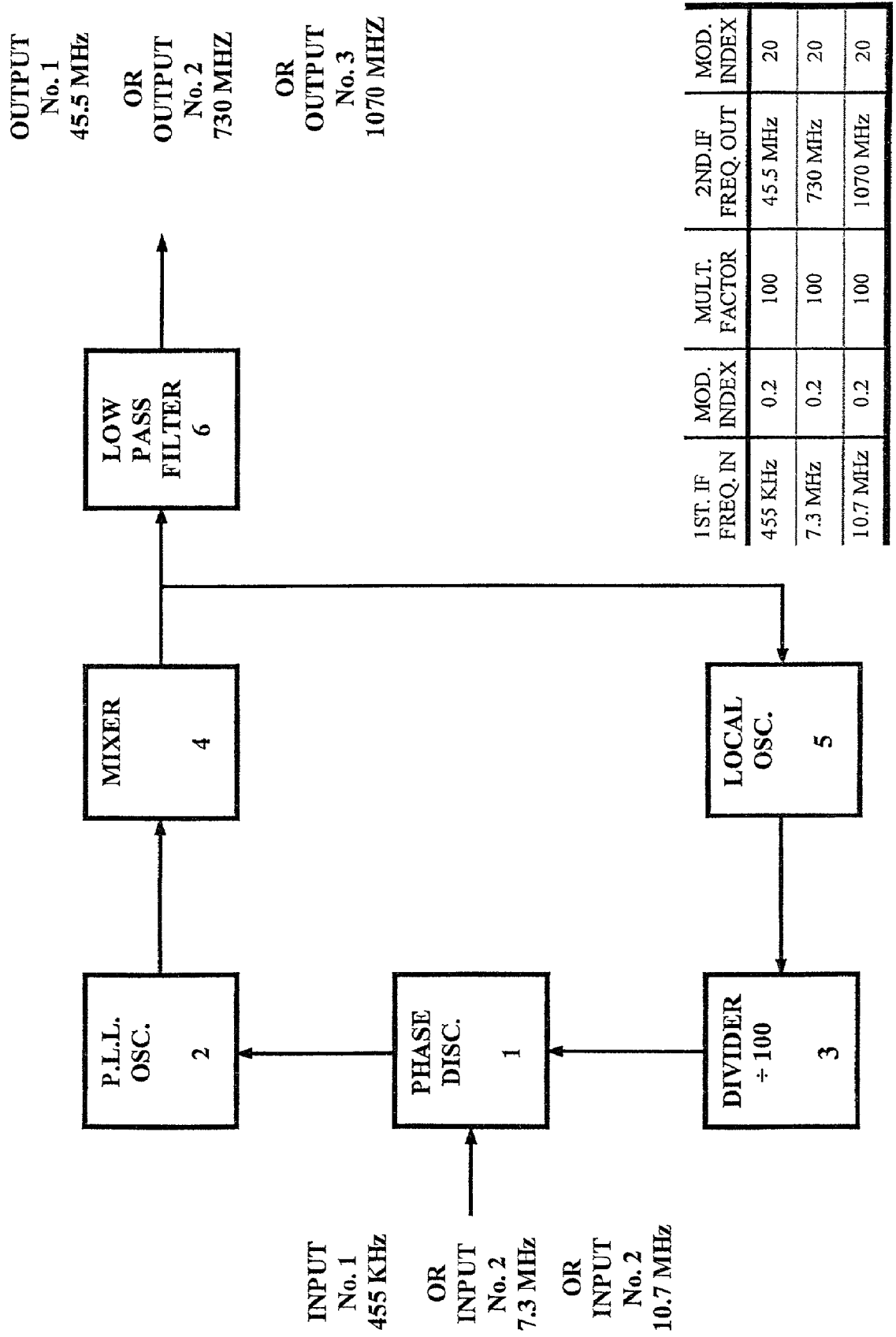

FIGS. 10A and 10B show an exemplary phase lock loop which may be used to implement the frequency multiplication function performed by element 275 in FIGS. 4–9.

According to the circuit of FIG. 10A, an oscillator 2 of the phase lock loop oscillates with the N-th harmonic of the input frequency, N being a positive integer. A phase discriminator 1 compares the input signal, which may be at 455 KHz, with the oscillator signal after it is divided by factor N (for example, 20) in divider 3 which is inserted in a closed loop of the phase lock loop amplifier. At the output of the phase lock loop oscillator 2, there is a mixer 4 with local oscillator 5. This mixer is followed by a low pass filter 6. Assuming the 455 KHz input signal mentioned above, the low pass filter provides a signal at 9.1 MHz, a factor N=20 times the input signal's frequency.

According to the circuit of FIG. 10B, an oscillator 2 of the phase lock loop oscillates with the N-th harmonic of the input frequency, N being a positive integer. A phase discriminator 1 compares the input signal, which may be one of a standard intermediate frequency (IF) at 455 KHz, or 7.3 MHz, or 10.7 MHz, with the oscillator signal after it is divided by factor N (for example, 100) in divider 3 which is inserted in a closed loop of the phase lock loop amplifier. At the output of the phase lock loop oscillator 2, there is a mixer 4 with local oscillator 5. This mixer is followed by a low pass filter 6. Assuming the 455 KHz input signal mentioned above, the low pass filter provides a signal at 45.5 MHz, a factor N=100 times the input signal's frequency.

The invention is not limited to the particular frequencies mentioned above. The PLL is available with upper frequency limits of over 1 GHz. According to the two options, the input signal to phase discriminator 1 is a standard narrowband first IF signal at 455 KHz and the output signal from low pass filter 6 is a non-standard wideband second IF signal at 45.5 MHz. However, the invention also provides that, for example, the input may be a standard narrowband first IF signal which can be 7.3 MHz or 10.7 MHz so that the output signal is a non-standard wideband second IF signal at 730 MHz or 1070 MHz.

Figure 11:
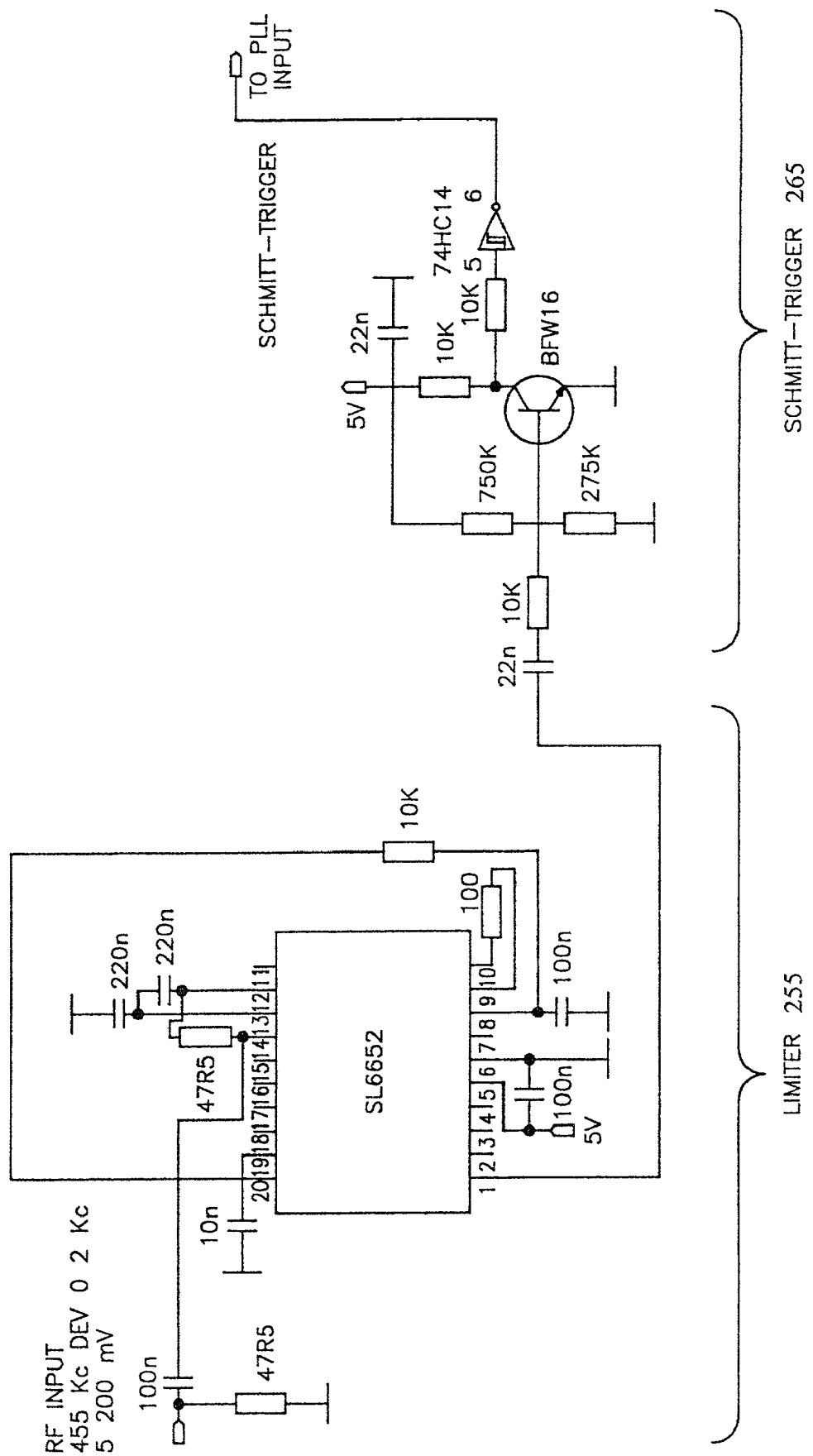
FIG. 11 shows details of an embodiment of a limiter and schmitt trigger device which may be used in embodiments of the receiver according to the present invention.

FIG. 11 illustrates details of an embodiment of a limiter and schmitt trigger according to an embodiment of the invention. The illustrated elements may be considered detailed implementations of certain elements shown in FIGS. 1B and 4–9.

For the limiter 255, an SL6652 limiter amplifier is used. The input signal with (for example) a center frequency of 455 kHz in the exemplary embodiment and between 5 and 200 millivolts at 50 ohms is input to pin 14 through a 100 nanofarad capacitor. The differential amplifier is operated in unbalanced mode, with two capacitors and a resistor connected as shown to pins 12–14. The SL6552's internal frequency changer and oscillator are not used in this embodiment.

The schmitt trigger portion 265 receives a square signal with an amplitude of about 500 millivolts, as output by pin 1 of the SL6552. An amplifier circuit having a BFW16 transistor adjusts the signal to CMOS levels, serving as modulation input for the schmitt trigger portion. The schmitt trigger portion provides the signal which is input to the phase lock loop whose detailed implementation is shown in FIGS. 12A and 12B.

Figure 12A:
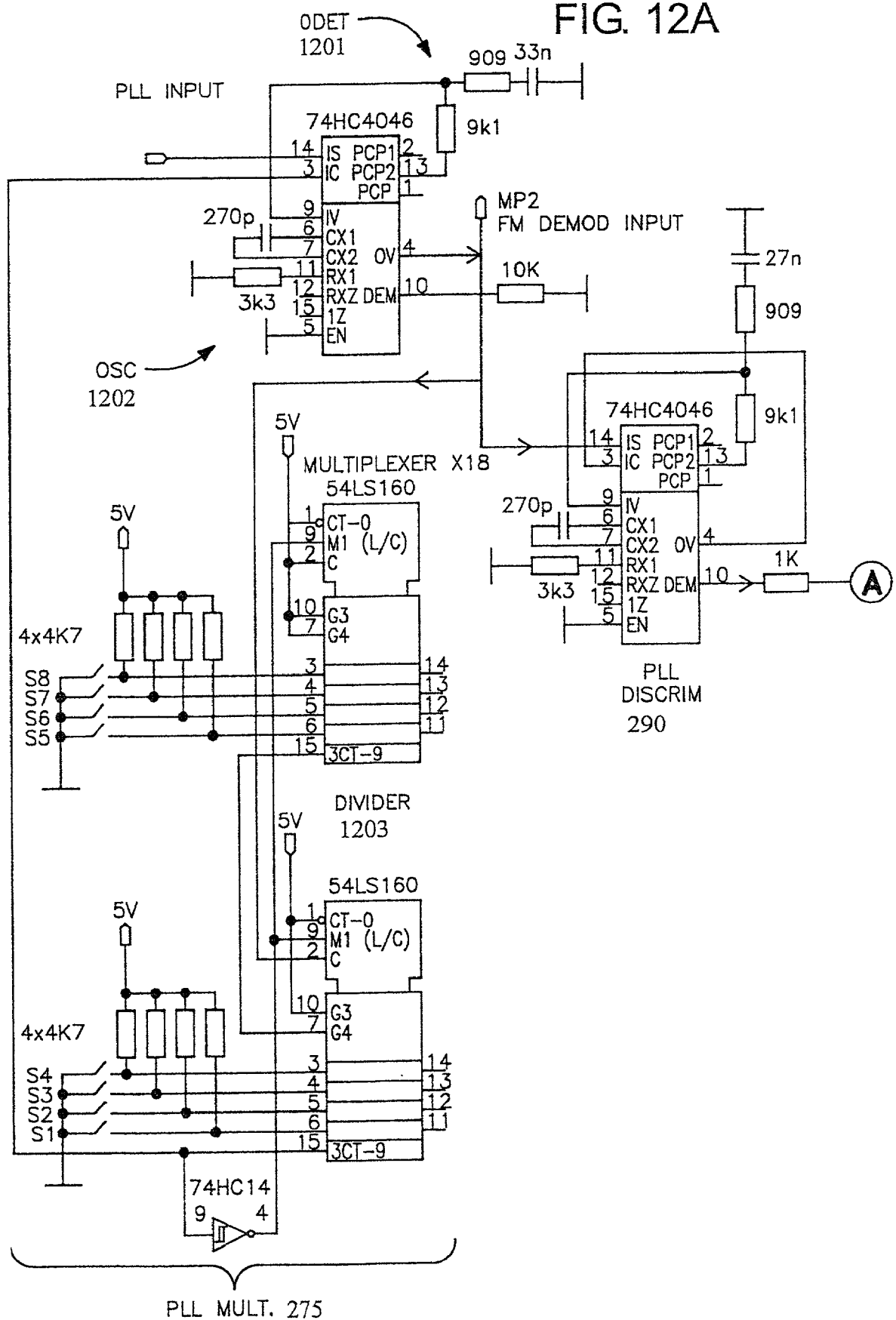
FIGS. 12A and 12B show details of an embodiment of a phase lock loop which may be used in an embodiment of the receiver according to the present invention.
Figure 12B:
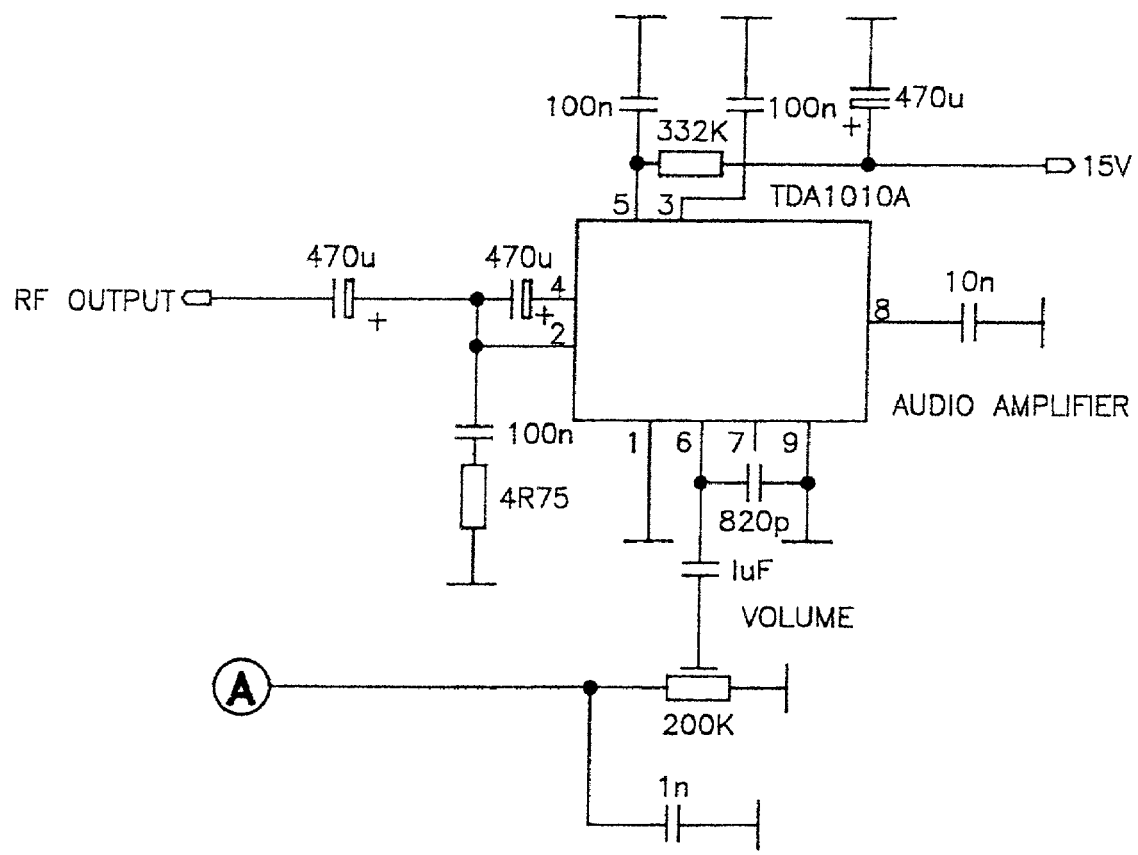

Referring now to FIGS. 12A and 12B, a 74HC4046 oscillator 1202 is shown with associated resistor and capacitor on pins 6, 7, 11 whose values are chosen to allow a maximum frequency of about 10 MHz. A phase comparator (phase detector) 1201 is also illustrated. Comparator number two on the chip is used in this application, and is triggered by a positive slope. The phases of signals on pins 14 and 3 are effectively compared. The 9.9 K ohm resistor and 33 nanofarad capacitor supply the comparison output signal from pin 13 to pin 9 as the control voltage to the oscillator. The 909 ohm resistor provides stability to the loop.

The oscillator output is at pin 4, and is input to 54LS160 binary coded decimal counters serving as loop divider element 1203. The detailed operation of the programmable counters need not be described here as it is well within the ability of those skilled in the art. In any event, the counters provide a signal to the phase comparator's pin 3 which represents a frequency smaller than the oscillator's output frequency by a factor which is determined by the value (for example, 20) which is programmable into the counter.

The demodulation is performed by the 74HC4046 which receives the output signal from pin 4 of the oscillator 1202. This 74HC4046 performs the demodulation function as a conventional FM-PLL discriminator in a manner appreciated by those skilled in the art, and need not be described here. In any event, the demodulator provides an output on pin 11, with the 1 nanofarad capacitor to ground preventing modulation of the following audio frequency amplifier TDA1018A by unwanted high frequency components in the control voltage.

Of course, the particular circuits shown are only illustrative of ways in which the invention may be implemented, and the scope of the invention should be limited not by these implementations but by the language of the claims and their equivalents.

The illustrated embodiments of the invention have the following feature(s):

Modulator-Transmitter. Preferred embodiments of FM/PM transmitter according to the present invention incorporate the following features:

(1) The modulating frequency is 15 KHz, and the amplitude of the modulating signal is designed so that the primary frequency deviation is reduced, so that the total frequency deviation of the transmitted frequency does not exceed a preselected narrow or very narrow bandwidth, for example, ±3 KHz (modulation index 0.2).

(2) Crystals with higher frequencies than conventional crystals are used to eliminate the secondary frequency deviation (frequency multiplier) stage.

(3) In addition to the narrow bandpass filter used to suppress the upper and lower sidebands, the transmitter typically includes other bandpass filters which are designed to avoid interference and to reduce noise. Such bandpass filters are used to prevent the wideband FM transmitter from exceeding the bandwidth and interfering with the adjacent channels. In addition, the tuned load impedance acts as a bandpass filter to prevent distortion of the transmitted signal.

(4) Means are provided for removing distortion in the transmitter caused by an FM modulated signal in the transmitter, particularly when the modulation index is very low and the modulating signals are sine waves. Such means are preferably implemented using a quasi-steady-state method if the maximum rate of change of the instantaneous frequency is small, or the curves giving magnitude and phase of the admittance Y in the circuit of the transmitter as a function of frequency are both substantially linear over the range of instantaneous frequencies involved.

Receiver-Demodulator. In order to receive the narrow band FM/PM signal from the transmitter, preferred embodiments of FM/PM receivers according to the present invention preferably incorporate the following characteristics:

(1) The bandpass filters in the receiver are designed so that the narrow band signal can be received without excessive interference.

(2) The local oscillator is designed with an IF frequency value of a standard 455 kHz to avoid high frequency IF after the multiplier stage, or with a second mixer in order to obtain a lower IF frequency of 455 kHz or lower.

(3) Wave-shaping circuits convert sine wave IF signals into clean positive pulses.

(4) A frequency multiplier stage is incorporated before the discriminator, being especially desirable when implemented in the short wave (SW) or medium wave (MW) bands.

(5) The FM receiver includes a radio frequency discriminator amplifier for receiving the narrow band FM/PM signal, followed by a limiter to eliminate amplitude variations in the signal, and a wave-shaping circuit. Then, a means for multiplying the frequency of the IF signal, for example by a multiplication factor of 20, is used. In this way, a secondary frequency deviation is generated locally in the receiver, and the frequency deviation which was minimized in the FM transmitter is compensated (e.g., 3 KHz×20=60 KHz). As a result, a new wide band signal (modulation index 4) is realized in the receiver despite its narrow bandwidth in the transmitted signal.

(6) The new wide band signal may be passed through a limiter to eliminate amplitude variations in the signal. The signal is then passed to a discriminator which converts the FM signal output from the limiter to an audio signal. Through the discriminator, the signal's frequency output is set at the rate of the frequency deviation, and its amplitude is made proportional to the magnitude of the frequency deviation. Finally, the signal is passed to an output stage which includes an audio amplifier and conventional signal processing circuits.

Thus, in summary, according to the present invention, narrow band FM/PM communication is implemented by transmitting a signal with a small/very small frequency deviation (for example, ±3 KHz). Preferably after the signal is converted down to an IF signal, the signal with the small frequency deviation is expanded in the receiver by frequency multiplying the IF converted signal. As a consequence, the bandwidth limitation (that is, the frequency deviation of the transmitter and of the communication channel) is expanded in the receiver. The result is a high quality sound output comparable to the quality of sound recorded on CD-ROM.

In implementing a narrow band FM/PM system in accordance with the present invention, it is very important to set up a standard to determine the channel spacing to control the total frequency deviation in the transmitter and to determine the minimum frequency multiplication factor to the intermediate frequency in the receiver because the maximum frequency multiplication factor depends on the bandwidth of the PLL circuit (a hardware characteristic).

In contrast to the present invention, in conventional frequency modulation (FM) or phase modulation (PM) with small frequency deviation (that is, with a modulation index M of 0.2 or less), the output signal is comparatively small when using conventional frequency discrimination for demodulation. As a result, signal distortions are comparatively high. However, in many cases, it is advantageous to use a frequency modulation with small modulation index M, as the frequency modulation can be increased in using FM or PM with a small/very small frequency deviation.

In accordance with the present invention, the transmission of FM or PM signals can be realized with a narrow/very narrowband channel with improved sound quality. With the invention, the number of channels of transmission with given frequency range can be increased, and the sound quality can be simultaneously improved.

Modifications and variations of the above-described embodiments of the present invention are possible, as appreciated by those skilled in the art in light of the above teachings. For example, the narrow/very narrowband FM according to the invention can be implemented in the medium wave band (MW-band) or the high frequency band (HF-band), can be broadcast in stereo and in digital audio format, and can be used for high definition television (digital video), fiber optic, and the like. It is therefore to be understood that, within the scope of the appended claims and their equivalents, the invention may be practiced otherwise than as specifically described.

What is claimed is:

1. A method for communicating information on a frequency modulated carrier frequency via a communication channel connecting a transmitter on a transmitting side and a receiver on a receiving side, involving frequency modulation with a modulation index M that is not greater than 0.2 to thus compress a bandwidth of the frequency-modulated carrier signal to have a small or very small frequency deviation and two sidebands at the output of the modulator of the transmitter, the method comprising:

frequency modulating a carrier frequency with a modulation index M that is not greater than 0.2 to compress a bandwidth of the frequency-modulated signal to form a narrow band or very narrow band frequency-modulated carrier signal having a small or very small carrier frequency deviation at the transmitting side of a narrow or very narrow band communication channel and in said communication channel;

filtering the narrow band or very narrow band frequency-modulated carrier signal to remove upper and lower sidebands of the narrow band or very narrow band frequency-modulated information carrier signal;

transmitting, via the communication channel, said narrow band or very narrow band frequency-modulated carrier signal without the upper and lower sidebands such that the transmitted frequency-modulated carrier signal obtains a total power of said transmitter and includes only the instantaneous frequency varied about the carrier frequency;

receiving the narrow band or very narrow band frequency-modulated carrier signal without any upper and lower sidebands from the communication channel at the receiving side of the communication channel; and expanding the frequency deviation of the received narrow band or very narrow band frequency-modulated carrier signal, without any upper and lower sidebands at the receiving side and outside of said communication channel so as to form an expanded-wideband-frequency deviation signal, the step of expanding for improving a signal-to-noise ratio and performed such that a bandwidth of said narrow band or very narrow band communication channel is never expanded.

2. The method as set forth in claim 1, further comprising: converting the expanded-wideband-frequency-deviation signal to a low frequency signal or audio signal.

3. The method as set forth in claim 1, further comprising: further processing the expanded-wideband-frequency-deviation signal.

4. The method as set forth in claim 1, further comprising: converting the narrowband or very narrowband frequency-modulated carrier signal without upper and lower sidebands received from the communication channel to a narrowband intermediate frequency (IF) signal without upper and lower sidebands before expanding its frequency deviation.

5. The method as set forth in claim 4, further comprising: passing the narrowband IF signal without upper and lower sidebands through a half wave rectifier and schmitt trigger; and cleaning an information signal output by the schmitt trigger with a wave shaping circuit.

6. The method as set forth in claim 1, wherein the expanding step includes:
   expanding the frequency deviation of the received narrowband or very narrowband frequency-modulated carrier signal without upper and lower sidebands by frequency multiplication.

7. The method as set forth in claim 1, wherein the expanding step includes:
   expanding the frequency deviation of the received narrowband or very narrowband frequency-modulated carrier signal without the upper and lower sidebands by a frequency multiplier.

8. The method as set forth in claim 1, further comprising:
   removing noise from the narrowband or very narrowband frequency-modulated carrier signal without the upper and lower sidebands received from the communication channel before converting said narrowband or very narrowband frequency-modulated carrier signal without the upper and lower sidebands to a low frequency signal or audio signal.

9. The method as set forth in claim 1, further comprising after the step of expanding, the step of demodulating the expanded-wideband-frequency-deviation signal to output an audio signal having sound quality comparable to sound recorded on CD-ROM.

10. A receiver for receiving and processing narrow band or very narrow band frequency-modulated information signals without upper and lower sidebands that have a predetermined small or very small frequency deviation due to compression of transmitted signals, and that have been transmitted over a narrow band or very narrow band communication channel, the receiver composing:
   means for receiving from the communication channel the narrow band or very narrow band frequency-modulated information signals without the upper and lower sidebands, said narrow band or very narrow band frequency-modulated information signals without the upper and lower sidebands having the predetermined small or very small frequency deviation; and
   a circuit that expands the predetermined small or very small predetermined frequency deviation of the received narrow band or very narrow band frequency-modulated information signals without the upper and lower sidebands to form an expanded wideband frequency deviation information signal, said frequency deviation expanding circuit including a phase lock loop circuit having a frequency divider with a dividing ratio that corresponds to a selected expansion of the frequency deviation, an output signal of the phase lock loop circuit being down-converted to a second wideband intermediate frequency information signal.

11. The receiver according to claim 10, wherein the frequency deviation expanding circuit includes:
   a circuit having frequency-multiplying characteristics; and
   a filter, connected to an output of the circuit having frequency-multiplying characteristics, the filter passing a multiplied-frequency signal component.

12. The receiver according to claim 10, further comprising:
   means for removing noise from information signals from the receiving means before said signals from said receiving means are converted to a low frequency signal or audio signal.

13. A transmitter for transmitting a frequency-modulated carrier frequency signal via a communication channel connecting a transmitting side and a receiving side, involving frequency modulation with a modulation index M that is not greater than 0.2 to thus compress a bandwidth of the carrier signal to have a small or very small frequency deviation at the transmitting side of the communication channel and in the communication channel, the transmitter comprising:
   means for frequency modulating a carrier signal with a modulation index M that is not greater than 0.2 to compress a bandwidth of the information carrier signal to form a narrow band or very narrow band frequency-modulated carrier signal having a small or very small frequency deviation at the transmitting side of a narrow or very narrow band communication channel and in said communication channel;
   means for filtering said narrow band or very narrow band frequency-modulated carrier signal output from said modulating means to remove upper and lower sidebands of the narrow band or very narrow band frequency-modulated carrier signal prior to transmission; and
   means for transmitting, via the communication channel, said narrow band or very narrow band frequency-modulated carrier signal without the upper and lower sidebands such that the transmitted carrier signal obtains a total power of said transmitter and includes only the instantaneous frequency varied about the carrier frequency.

14. The transmitter according to claim 13, wherein said means for filtering includes a bandpass filter.

15. A method for communicating information on a phase-modulated carrier frequency via a communication channel connecting a transmitter on a transmitting side and a receiver on a receiving side, involving phase modulation with a modulation index M that is not greater than 0.2 to thus compress a bandwidth of the phase-modulated carrier signal to have a small or very small frequency deviation and two sidebands at the output of the modulator of the transmitter, the method comprising:
   phase modulating a carrier frequency with a modulation index M that is not greater than 0.2 to compress a bandwidth of the phase-modulated carrier signal to form a narrow band or very narrow band phase-modulated carrier signal having a small or very small carrier frequency deviation at the transmitting side of a narrow or very narrow band communication channel and in said communication channel;
   filtering the narrow band or very narrow band phase-modulated carrier signal to remove upper and lower sidebands of the narrow band or very narrow band phase-modulated carrier signal;
   transmitting, via the communication channel, said narrow band or very narrow band phase-modulated carrier signal, the instantaneous frequency varied about the carrier frequency only, without the upper and lower sidebands such that the transmitted phase-modulated carrier signal obtains a total power of said transmitter;
   receiving the narrow band or very narrow band phase-modulated carrier signal without any upper and lower sidebands from the communication channel at the receiving side of the communication channel; and
   expanding the frequency deviation of the received narrow band or very narrow band phase-modulated carrier signal, without any upper and lower sidebands at the receiving side and outside of said communication channel so as to form an expanded-wideband-frequency deviation signal, the step of expanding for improving a signal-to-noise ratio and performed such that a bandwidth of said narrow band or very narrow band communication channel is never expanded.

16. The method as set forth in claim 15, further comprising:
converting the expanded-wideband-frequency-deviation signal to a low frequency signal or audio signal.

17. The method as set forth in claim 15, further comprising:
further processing the expanded-wideband-frequency-deviation signal.

18. The method as set forth in claim 15, further comprising:
converting the narrowband or very narrowband phase-modulated carrier signal without upper and lower sidebands received from the communication channel to a narrowband intermediate frequency (IF) signal without upper and lower sidebands before expanding its frequency deviation.

19. The method as set forth in claim 18, further comprising:
passing the narrowband IF signal without upper and lower sidebands through a half wave rectifier and schmitt trigger; and
cleaning an signal output by the schmitt trigger with a wave shaping circuit.

20. The method as set forth in claim 15, wherein the expanding step includes:
expanding the frequency deviation of the received narrowband or very narrowband phase-modulated carrier signal without upper and lower sidebands by frequency multiplication.

21. The method as set forth in claim 15, wherein the expanding step includes:
expanding the frequency deviation of the received narrowband or very narrowband phase-modulated carrier signal without the upper and lower sidebands by a phase-lock loop (PLL) frequency multiplier.

22. The method as set forth in claim 15, further comprising:
removing noise from the narrowband or very narrowband phase-modulated carrier signal without the upper and lower sidebands received from the communication channel before converting said narrowband or very narrowband phase-modulated carrier signal without the upper and lower sidebands to a low frequency signal or audio signal.

23. The method as set forth in claim 15, further comprising after the step of expanding, the step of demodulating the expanded-wideband-frequency-deviation signal to output an audio signal having sound quality comparable to sound recorded on CD-ROM.

24. A receiver for receiving and processing narrow band or very narrow band phase-modulated signals without upper and lower sidebands that have a predetermined small or very small frequency deviation due to compression of transmitted signals, and that have been transmitted over a narrow band or very narrow band communication channel, the receiver comprising:
means for receiving from the communication channel the narrow band or very narrow band phase-modulated signals without the upper and lower sidebands, said narrow band or very narrow band phase-modulated signals without the upper and lower sidebands having the predetermined small or very small frequency deviation; and
a circuit that expands the predetermined small or very small predetermined frequency deviation of the received narrow band or very narrow band phase-modulated signals without the upper and lower sidebands to form an expanded wideband frequency deviation signal, said frequency deviation expanding circuit including a phase lock loop circuit having a frequency divider with a dividing ratio that corresponds to a selected expansion of the frequency deviation, an output signal of the phase lock loop circuit being down-converted to a second wideband or very wideband intermediate frequency information signal.

25. The receiver according to claim 24, wherein the frequency deviation expanding circuit includes:
a circuit having frequency-multiplying characteristics; and
a filter, connected to an output of the circuit having frequency-multiplying characteristics, the filter passing a multiplied-frequency signal component.

26. The receiver according to claim 24, further comprising:
means for removing noise from signals from the receiving means before said signals from said receiving means are converted to a low frequency signal or audio signal.

27. A transmitter for transmitting a phase-modulated carrier frequency signal via a communication channel connecting a transmitting side and a receiving side, involving phase modulation with a modulation index M that is not greater than 0.2 to thus compress a bandwidth of the carrier signal to have a small or very small frequency deviation at the transmitting side of the communication channel and in the communication channel, the transmitter comprising:
means for phase modulating a carrier signal with a modulation index M that is not greater than 0.2 to compress a bandwidth of the carrier signal to form a narrow band or very narrow band phase-modulated carrier signal having a small or very small frequency deviation at the transmitting side of a narrow or very narrow band communication channel and in said communication channel;
means for filtering said narrow band or very narrow band phase-modulated carrier signal output from said modulating means to remove upper and lower sidebands of the narrow band or very narrow band phase-modulated carrier signal prior to transmission; and
means for transmitting, via the communication channel, said narrow band or very narrow band phase-modulated carrier signal without the upper and lower significant sidebands such that the transmitted carrier signal obtains a total power of said transmitter and includes only the instantaneous frequency varied about the carrier frequency.

28. The transmitter according to claim 27, wherein said means for filtering includes a bandpass filter.

29. The method according to claim 1, wherein said method steps are applied within a wired digital and/or analog telecommunication system.

30. The method according to claim 1, wherein said method steps are applied within a wireless digital and/or analog telecommunication system.

31. The method according to claim 15, wherein said method steps are applied within a wired digital and/or analog telecommunication system.

32. The method according to claim 15, wherein said method steps are applied within a wireless digital and/or analog telecommunication system.

* * * * *